(No Model.) 6 Sheets—Sheet 1.
W. BRITAIN, Jr.
LOOM.
No. 506,467. Patented Oct. 10, 1893.
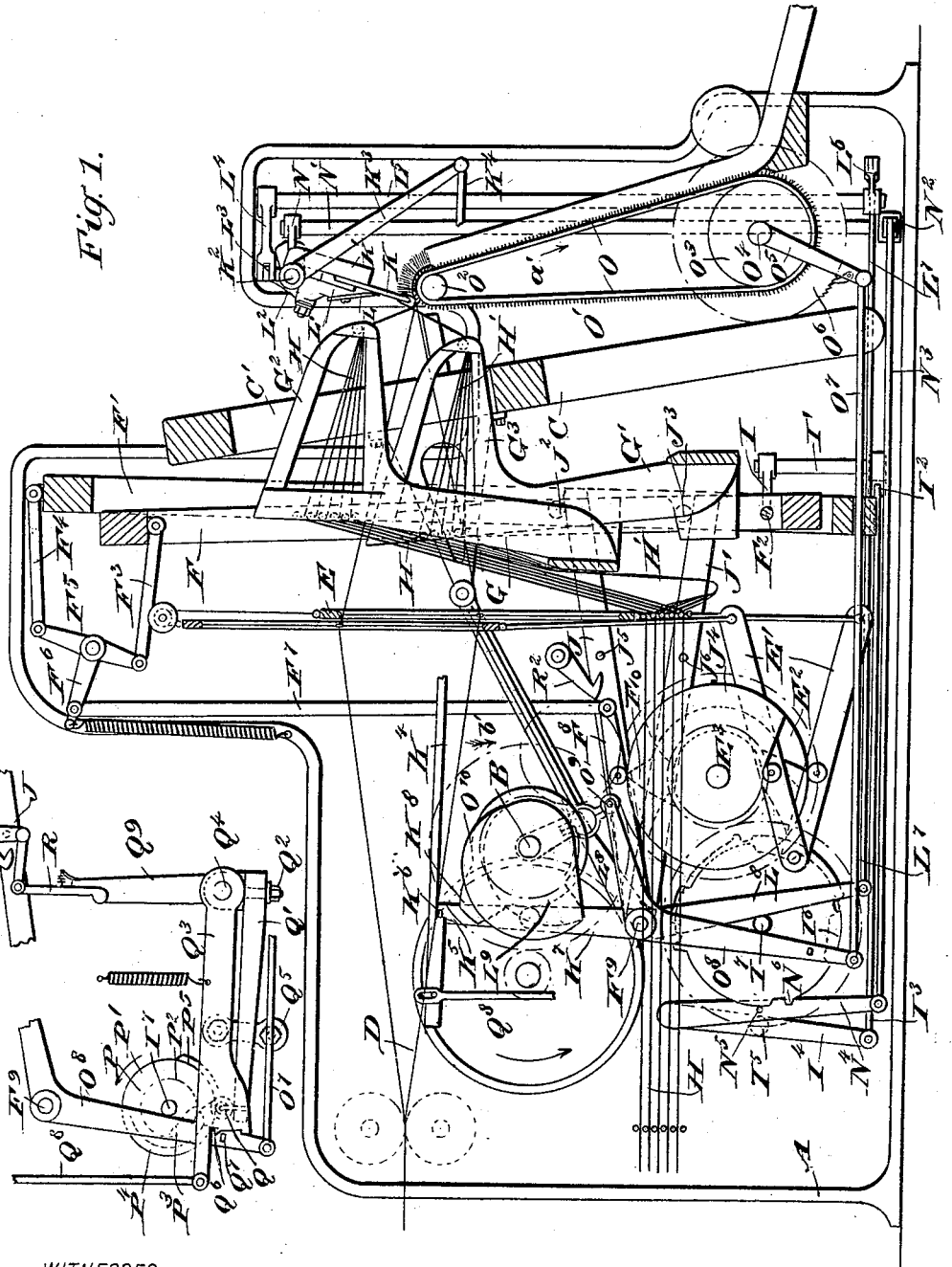
WITNESSES:
INVENTOR:
W. Britain Jr.
BY
Munn & Co
ATTORNEYS.

(No Model.) 6 Sheets—Sheet 2.
W. BRITAIN, Jr.
LOOM.

No. 506,467. Patented Oct. 10, 1893.

WITNESSES:

INVENTOR:
W. Britain Jr.
BY Munn & Co
ATTORNEYS.

(No Model.) 6 Sheets—Sheet 3

W. BRITAIN, Jr
LOOM.

No. 506,467. Patented Oct. 10, 1893.

WITNESSES:
J. E. Caswell
C. Sedgwick

INVENTOR:
W. Britain Jr
BY Munn & Co
ATTORNEYS.

(No Model.) 6 Sheets—Sheet 4.
W. BRITAIN, Jr.
LOOM.

No. 506,467. Patented Oct. 10, 1893.

WITNESSES:

INVENTOR:
W. Britain Jr.
BY Munn & Co
ATTORNEYS.

(No Model.) 6 Sheets—Sheet 5.
W. BRITAIN, Jr.
LOOM.
No. 506,467. Patented Oct. 10, 1893.
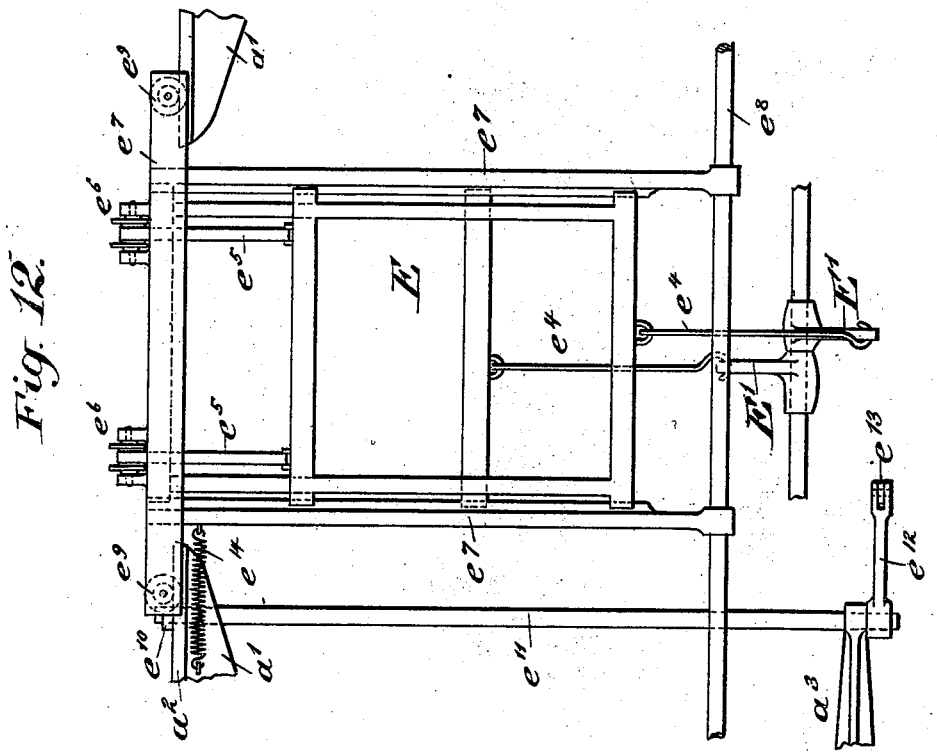
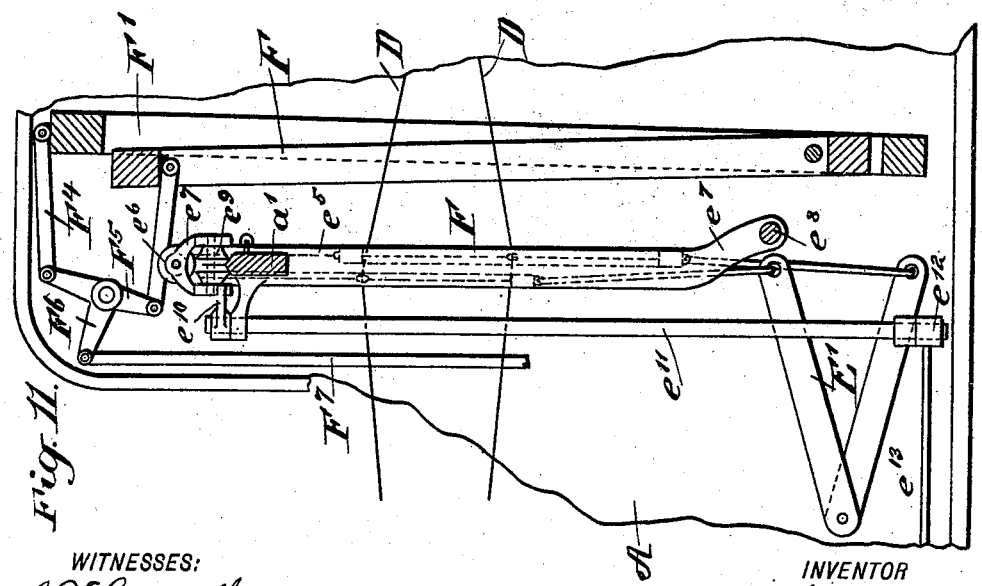
WITNESSES:
J. A. E. Cruswell
E. Sedgwick
INVENTOR
W. Britain Jr.
BY Munn & Co
ATTORNEYS.

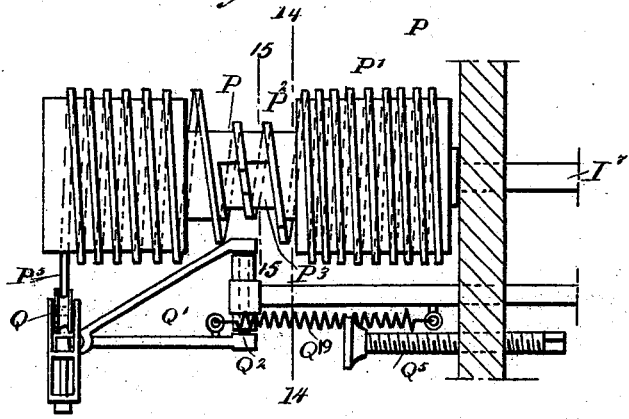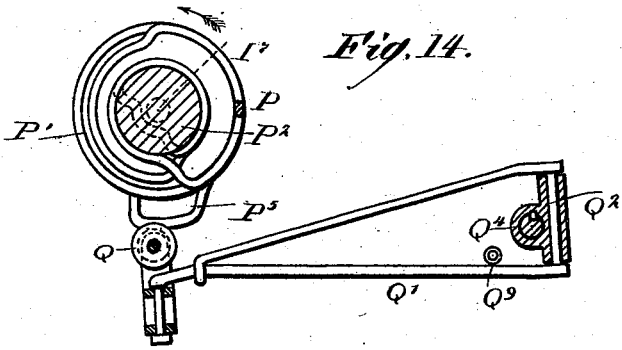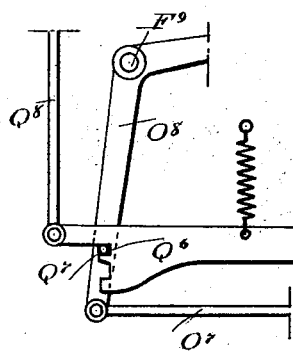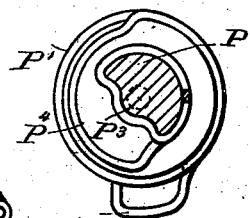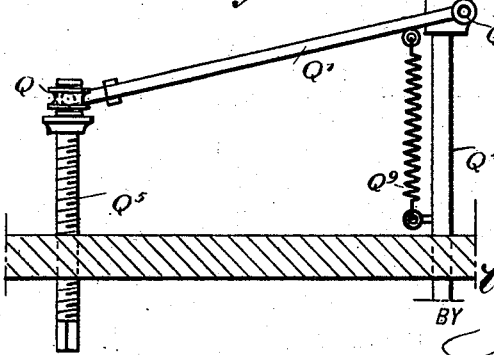

UNITED STATES PATENT OFFICE.

WILLIAM BRITAIN, JR., OF LONDON, ENGLAND.

LOOM.

SPECIFICATION forming part of Letters Patent No. 506,467, dated October 10, 1893.

Application filed March 28, 1892. Serial No. 426,841. (No model.) Patented in England July 24, 1890, No. 11,614; in France September 26, 1891, No. 216,374, and in Belgium September 28, 1891, No. 96,571.

*To all whom it may concern:*

Be it known that I, WILLIAM BRITAIN, Jr., of London, England, have invented a new and Improved Loom, (for which I have obtained patents in Great Britain, No. 11,614, dated July 24, 1890; in France, No. 216,374, dated September 26, 1891, and in Belgium No. 96,571, dated September 28, 1891,) of which the following is a full, clear, and exact description.

The invention relates to looms for producing coir yarn mats, and similar fabrics.

The object of the invention is to provide a new and improved loom, which is simple and durable in construction, very effective in operation, and arranged to produce a high grade fabric in which the tufts of the pile are looped around the ground warps instead of being caught by the weft, as in ordinary pile fabrics.

The invention consists principally of pile yarn carriers passing between the reed plates of the batten and extending nearly to the fell of the cloth, together with means for causing each carrier to pass alternately on opposite sides of the ground warp which passes between the same reed plates.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 3:
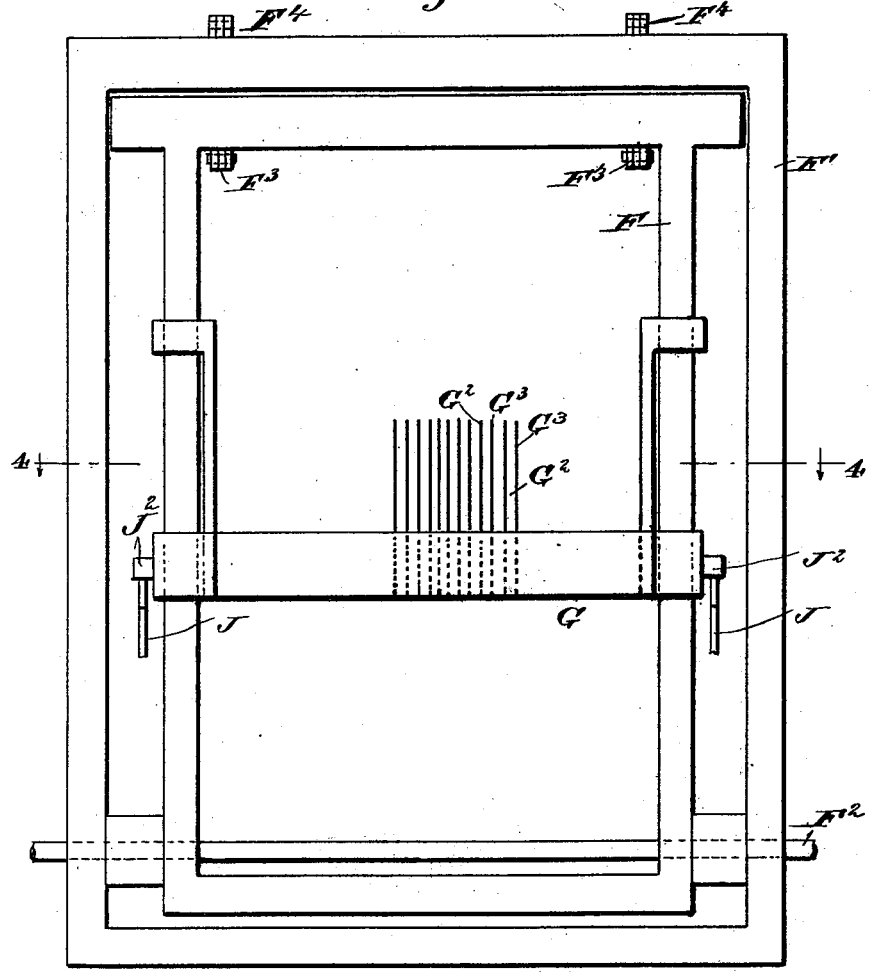
Figure 4:
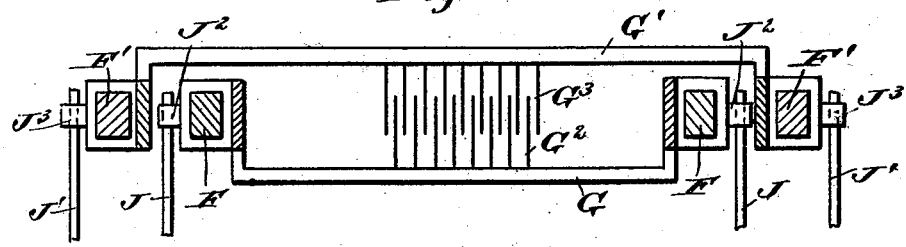
Figure 5:
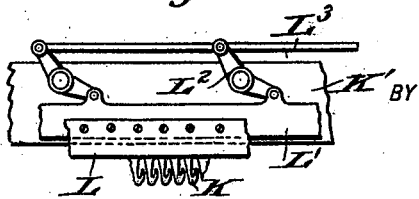
Figure 6:
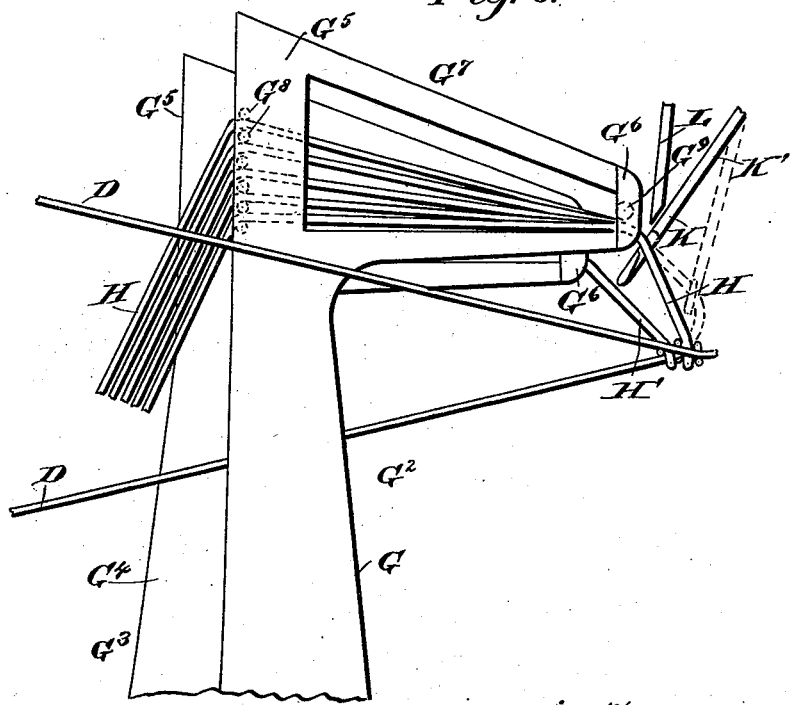
Figure 7:
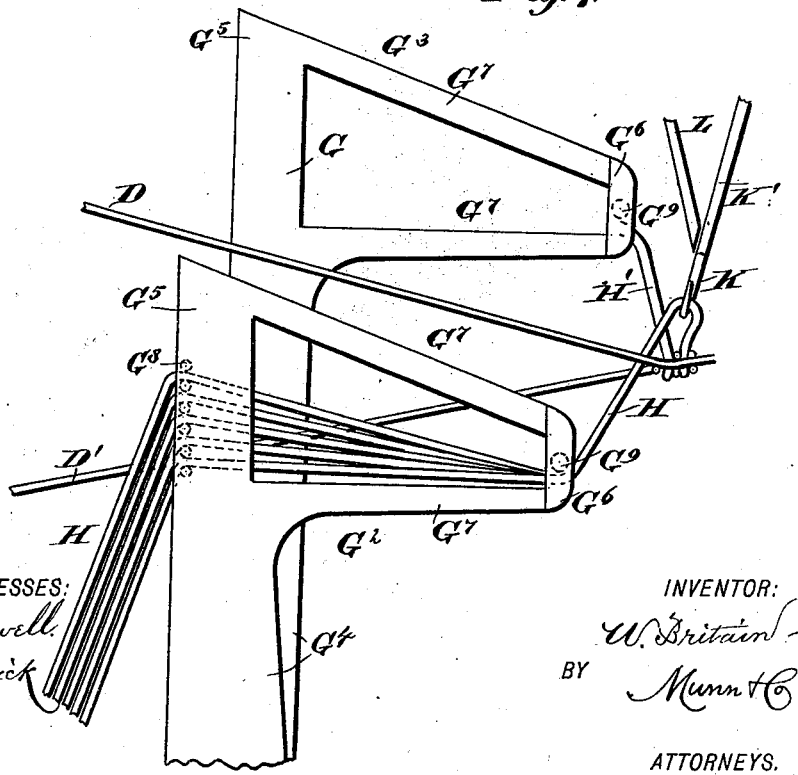
Figure 8:
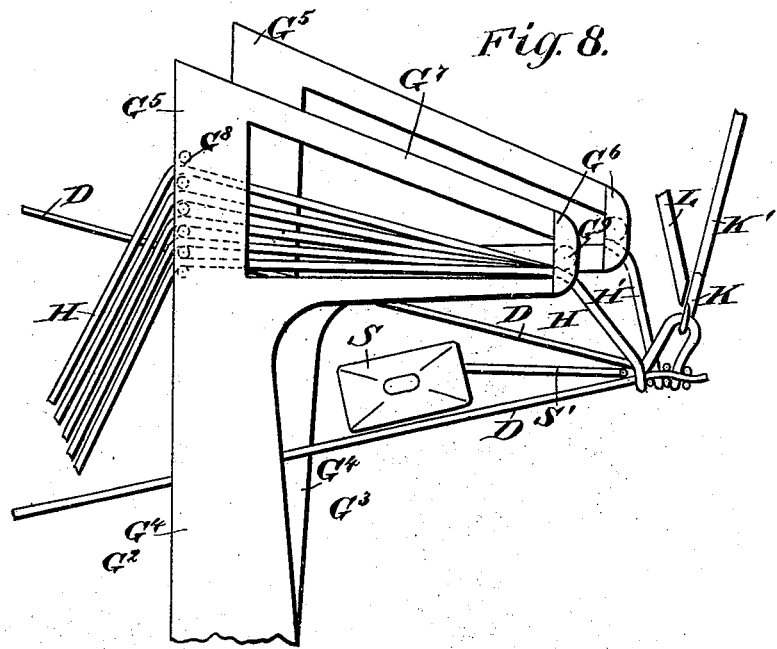
Figure 9:
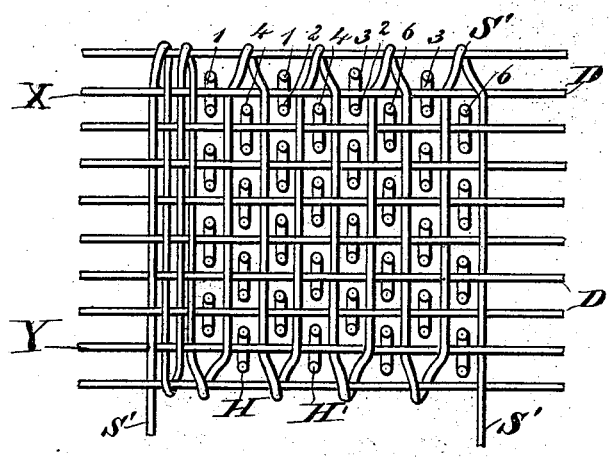
Figure 10:
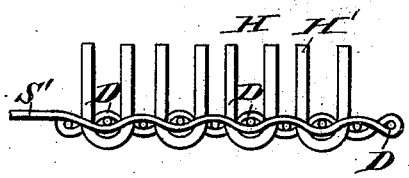

Figure 1 is a sectional side elevation of the improvement. Fig. 2 is a side elevation of part of the mechanism for automatically controlling the length of the fabric. Fig. 3 is a front elevation of the rocking frames carrying the pile carriers, one of the latter being in position. Fig. 4 is a sectional view of the same on the line 4—4 of Fig. 3, with both carriers in position. Fig. 5 is a front view of part of the pile cutting mechanism. Figs. 6, 7 and 8, are enlarged side elevations of the pile forming mechanism in different positions. Fig. 9 is a plan view of the fabric. Fig. 10 is an end view of the same. Fig. 11 is a sectional side elevation of a modified form of the device for shifting the ground warp sidewise instead of the pile warp; and Fig. 12 is a front view of the same. Fig. 13 is an enlarged plan view of the drum and adjacent parts. Fig. 14 is a transverse section of the same on the lines 14—14 of Fig. 13. Fig. 15 is a like view of the same on the lines 15—15 of Fig. 13. Fig. 16 is a side elevation of part of the mechanism for automatically controlling the length of the fabric. Fig. 17 is a sectional plan view of part of the same.

The improved loom is provided with a suitably constructed frame A, in which is journaled the transversely extending main shaft B, connected by the usual mechanism with the batten C, mounted to swing and provided with reed plates C' somewhat longer than the usual plates in ordinary battens. The ground warps D extend longitudinally and pass through the usual healds E, of any approved construction, and operated from levers E' actuated from cams $E^2$ held on a shaft $E^3$ extending transversely and driven from the main shaft B by suitable gears or other means.

Between the healds E and the batten C are arranged two frames F, F', of which the frame F is located within the frame F', but both are hung, at their lower ends, on a transversely extending shaft $F^2$ from which the frames are swung forward and backward and on which the frames can be moved transversely. The frames F and F' are moved alternately forward and backward, but are simultaneously moved sidewise, as hereinafter more fully described.

On the frames F and F' are fitted to slide vertically, the pile warp carrying frames G and G' respectively, supporting the pile warp carriers $G^2$ and $G^3$, through which pass the sets of pile warps H and H' respectively, extending longitudinally through the frame and passing over the usual rods to guide the said warps to the pile warp carriers. The latter pass between the reeds C' of the batten C and reach forward close to the fell of the cloth, see Figs. 1, 6, 7 and 8. Each alternate carrier is attached to the same frame G or G' held on the frames F or F' respectively, so that one half of the carriers are attached to one frame and the other half to the other frame, and each carrier passes between the reeds of the batten with the corresponding thread of the ground warp D.

By the upward and downward movement of the frames G and G', the pile warps H and H' respectively, are carried upward and downward between the ground warps D. By the sidewise movement of the frames F and F', each pile warp carrier after it has moved downward below the thread of the ground warp D with which it works, is moved sidewise such a distance that when it is again made to rise it moves up on the opposite side of the thread of the ground warp.

Each of the carriers $G^2$ and $G^3$ is composed of a thin plate $G^4$ secured, at its lower end, to the cross bar of the respective frame G or G', see Figs. 3 and 4. The upper portion $G^7$ of each carrier is held to the lower portion $G^4$ by side plates $G^5$ and $G^6$, located on each side of the main plates $G^4$ and $G^5$. Between the side plates $G^5$ is arranged a series of rollers $G^8$, over and under which the threads of the pile warp H pass and then extend forward and under a roller $G^9$, held between the side plates $G^6$. From this roller $G^9$ the threads pass to the point where the fabric is made, as is plainly illustrated in Figs. 1, 6, 7 and 8.

In order to impart a forward and backward swinging motion to the frames F and F', the latter are connected at their upper ends by links $F^3$ and $F^4$ respectively, with a three-armed lever $F^5$ fulcrumed on the main frame A and having its third arm $F^6$ extending rearward and at right angles to the arms connected with the links $F^3$ and $F^4$, see Fig. 1. The arm $F^6$ is connected by a rod $F^7$ with a lever $F^8$ fulcrumed on a stud $F^9$ supported from the main frame. On this lever is arranged a friction roller adapted to be engaged by a cam $F^{10}$ secured on the shaft $E^3$ operating the healds, as previously described. A spring presses on the arm $F^6$ so as to hold the lever $F^8$ in contact with the cam $F^{10}$. When the shaft $E^3$ revolves the cam $F^{10}$ imparts an up and down swinging motion to the lever $F^8$, whereby a rocking motion is given to the three-armed lever $F^5$ and the latter, by the links $F^3$ and $F^4$, imparts a forward and backward swinging motion to the frames F and F'.

In order to impart a very slight sidewise motion to the frames F and F', the latter are connected at their lower ends with an arm I held on a vertically arranged shaft I' mounted to turn in suitable bearings projecting from one side of the main frame A. On the lower end of the shaft I' is secured an arm $I^2$ pivotally connected by a link $I^3$ with a lever $I^4$, fulcrumed on the main frame and carrying a friction roller $I^5$ adapted to be engaged by a cam $I^6$ held on a shaft $I^7$, projecting from one side of the main frame A. The shaft $I^7$ is connected by gearing or other suitable means with the shaft $E^3$, thus receiving its motion from the said shaft. The cam $I^6$, in pressing on the friction roller $I^5$, actuates the lever $I^4$, so that the shaft I' is turned and, by the arm I, the sidewise motion is given to the frames F and F', the latter being moved in this direction on their fulcrum shaft $F^2$.

The amount of sidewise motion given to the frames F F', is very slight and is allowed for by the pins $J^2$ and $J^3$ sliding on the levers J J', hereinafter more fully described. It is understood that the frames F F' have only to move sidewise the distance of the thickness of a single warp thread and the actual travel in a full sized machine amounts to about seven-sixteenths of an inch.

In order to impart an up and down sliding motion to the carrier frames G and G' on the frames F and F' respectively, levers J and J' are provided, extending longitudinally and engaging projecting pins $J^2$ and $J^3$ respectively, arranged on the sides of the frames G and G', as is plainly seen by reference to Fig. 4. The levers J and J' are acted on by a cam $J^4$ held on the shaft $E^3$, the said cam imparting a swinging motion to the said levers, so that the frames G and G' are raised and lowered on their frames F and F'.

Instead of a transverse motion being given to the pile warp carriers, to carry the pile warps first to one side of the ground warps with which they are associated and then to the opposite side of these warps, as previously explained, the said pile warp carriers may simply be raised and lowered and the ground warps shifted sidewise to effect the same object. The sidewise movement of the ground warps can be obtained by causing the heald or harness frames E to slide up and down in another frame $e^7$ by the action of the cam levers E' and the flexible links $e^4$, as plainly illustrated in Figs. 11 and 12. The frame $e^7$ is supported by rollers $e^9$ traveling on guideways $a'$ projecting from the main frame. The frame $e^7$ is guided on the rod $e^8$ and is pushed in one direction by a finger piece $e^{10}$ secured on the upper end of a rocking shaft $e^{11}$ working in bearings $a^2$ and $a^3$, and connected through an arm $e^{12}$ and link $e^{13}$ to the same lever and cam as in the other form of the device were used to give the side motion to the frames F and F', as above described. The frame $e^7$ is returned by the action of a spring $e^{14}$ shown in Fig. 12.

Just above where the fabric is to be formed a number of hooks K are arranged in a row to hold up the pile to the required height. A knife blade L is adapted to slide over the said hooks K to cut the pile after it is formed, the said knife making, with each hook, a small pair of shears. The several hooks K are attached to a transversely extending bar K' hung on a shaft $K^2$ mounted to rock in suitable bearings formed in the sides of the main frame A. On this shaft $K^2$ is secured a downwardly and forwardly projecting arm $K^3$ pivotally connected with a rod $K^4$ extending longitudinally and rearwardly, as is plainly illustrated in Fig. 1. Near the rear end of the rod $K^4$ is formed a shoulder $K^5$ adapted to be engaged by a pin $K^6$ projecting from a lever $K^7$ fulcrumed on the stud $F^9$ previously mentioned. The lever $K^7$ is actuated by a cam $K^8$ secured on the main shaft B. Thus, when the latter is rotated the lever $K^7$ is swung outward and, by its pin $K^6$ engaging the shoulder $K^5$, a rearward pull is given to the rod $K^4$ and the latter, by being connected with the arm $K^3$, imparts a turning motion to the shaft $K^2$ in one direction. A turning motion in the opposite direction is given to the shaft $K^2$ by a spring coiled thereon (not shown.) A sidewise motion is also given to the bar or plate $K'$, and for this purpose the plate is connected with an arm $N$ secured on the upper end of a vertically arranged shaft $N'$, mounted to turn in suitable bearings on the frame $A$. On the lower end of this shaft $N'$ is secured an arm $N^2$ pivotally connected by a longitudinally extending link $N^3$ with a lever $N^4$, arranged next to the lever $I^4$ and provided with a friction roller or pin $N^5$ adapted to be acted on by a cam $N^6$ held on the shaft $I^7$ previously mentioned. When the latter is rotated, the cam $N^6$ presses on the friction roller or pin $N^5$ and imparts a swinging motion to the lever $N^4$ which, by the link $N^3$, turns the vertical shaft $N'$, and the latter, by the arm $N$ engaging the bar $K'$, shifts the latter transversely on the shaft $K^2$; thus the hooks $K$ receive a swinging as well as a laterally sliding motion. The sidewise motion is given to the hooks after they have been swung backward and caused to enter between the pile warps, so that as the hooks return, they catch the warp threads and draw them forward with them.

The knife blade $L$ is attached to a transversely extending bar $L'$, see Fig. 5, hung on levers $L^2$ pivoted on the bar $K'$; the upper ends of the said levers being pivotally connected with a transversely extending rod $L^3$, pivoted at one end to an arm $L^4$, secured to the upper end of a shaft $L^5$, arranged vertically and mounted to turn in suitable bearings held on the main frame $A$. On the lower end of the shaft $L^5$ is secured an arm $L^6$, pivotally connected by a link $L^7$ with a bell-crank lever $L^8$, fulcrumed on the stud $F^9$ previously mentioned. The bell-crank lever $L^8$ is acted on by a cam $L^9$ secured on the main shaft $B$, so that when the latter rotates, the said cam imparts a swinging motion to the lever $L^8$, whereby a turning motion is given to the shaft $L^5$ by the arm $L^6$ and link $L^7$ connecting the said shaft with the said lever. The arm $L^4$ on the shaft $L^5$, imparts a transverse motion to the rod $L^3$, so that the levers $L^2$ are actuated and the bar $L'$ carrying the knife blade $L$ is moved transversely on the hooks $K$ so as to cut the pile thereon, as previously explained.

The take-up mechanism is provided with an endless belt $O$ formed on its outer surface with short spikes $O'$, as is plainly illustrated in Fig. 1. The endless spiked belt $O$ passes, at its upper end, over a roller $O^2$ extending transversely and journaled in the sides of the main frame $A$. The fabric is formed at the top of the belt $O$, directly above the roller $O^2$ as is illustrated in the said figure. The lower end of the belt $O$ passes over a roller $O^3$ held on a shaft $O^4$ journaled in the frame $A$, on which is fulcrumed loosely an arm $O^5$ provided with a pawl in mesh with a ratchet wheel $O^6$ fastened either on the face of the roller $O^3$ or directly on the shaft $O^4$, so that when the said arm $O^5$ swings in one direction its pawl moves the ratchet wheel $O^6$ in the same direction, thus turning the roller $O^3$ and thereby imparting a traveling motion to the belt $O$ in the direction of the arrow $a'$. The free end of the arm $O^5$ is pivotally connected by a rod $O^7$ with a bell-crank lever $O^8$ fulcrumed on the stud $F^9$ previously mentioned. The upper arm of the bell-crank lever $O^8$ carries a friction roller $O^9$ adapted to be engaged by a cam $O^{10}$ held on the main driving shaft $B$. Thus, when the latter is rotated in the direction of the arrow $b'$, the said cam $O^{10}$ acts on the friction roller $O^9$ and thereby imparts a swinging motion to the bell-crank lever $O^8$, which latter imparts the movement to the arm $O^5$ to turn the ratchet wheel $O^6$, as above described.

As previously stated, the batten $C$ is worked from the main shaft $B$, and its shuttle race, where it would come against the take-up belt $O$ and where the pile warp carriers have to pass up and down, is sufficiently cut away, so that the shuttle, as it passes across from one side of the loom to the other, is supported by the warps only.

For controlling the workings of the loom an additional device is provided, which is actuated from the shaft $I^7$ and provided with a drum $P$ secured on the said shaft and formed on its rim with a spiral thread running around the periphery of the drum uniformly, as at $P'$, for a certain distance and then the drum is reduced to a much smaller size, as at $P^2$, and the thread continuing for a short distance, the drum is again reduced, as at $P^3$, and then the thread rises to the second size $P^2$ for a short distance, then rises again to a size $P^4$ intermediate between $P'$ and $P^2$, and then at $P^5$ rises again considerably above the periphery of the drum and finally terminates abruptly, as will be readily understood by reference to Figs. 13, 14, and 15. The spiral thread follows all the variations of the drum and this thread is engaged by a wheel $Q$ journaled on the free end of a lever $Q'$ fulcrumed on a vertically-arranged bolt $Q^2$ projecting from a rocking shaft $Q^4$ to which another lever $Q^3$ is fixed. The lever $Q'$ is mounted to swing horizontally on the pivot pin $Q^2$, see Fig. 14, and can swing up and down with the lever $Q^3$, so that the wheel $Q$ can readily follow the spiral thread and the several raised and reduced portions of the same above described. When the wheel $Q$ arrives at the end of the drum $P$, the lever $Q'$ is brought back to its former position by a spring $Q^{19}$, see Figs. 13, 14 and 15, as soon as the wheel $Q$ drops off the abrupt end $P^5$ of the spiral on the drum $P$, and then the wheel $Q$ again commences to travel along the drum, as before. The extent of the horizontal movement thus given to the lever Q' is limited by an adjustable stop $Q^5$ (see Figs. 13 and 17), to permit of regulating the length of the mat woven.

The lever $Q^3$, which only moves up and down with the lever Q', is provided near its free end with an irregularly shaped surface which serves to control the amount of take-up. For this purpose the irregular surface $Q^6$ operates on a pin $Q^7$ projecting from the bell-crank lever $O^8$ connected with the take-up belt O, so that the portion of the lever $Q^6$ against which the said pin $Q^7$ stops after each take-up regulates the next movement of the belt O. The free end of the lever $Q^3$ is also pivotally connected by a link $Q^8$ with the rod $K^4$ previously described, and connected with the shaft $K^2$ for imparting a swinging motion to the hooks K. Thus, when the lever $Q^3$ swings upward the link $Q^8$ moves in a like direction and lifts the rod $K^4$ so as to disengage its shoulder $K^5$ from the pin $K^6$ of the lever $K^7$, so that the rod $K^4$ is not actuated by the said lever $K^7$, as before described, and consequently the hooks K cease to swing. An arm $Q^9$ projects upward from the fulcrum end of the lever $Q^3$ and is connected, at its free end, by a spring knuckle joint R and link, to a lever R' which is fixed on a transverse axle with the hooks $R^2$ adapted to engage pins $J^5$ and $J^6$ projecting from the sides of the levers J and J' controlling the up and down swinging motion of the frames G and G' in the manner above described. Thus, when the hooks $R^2$ engage the pins $J^5$ and $J^6$ the said levers J and J' are locked in place, and the up and down sliding motion of the frames G and G' ceases. It is understood that the pile warp carriers are then held in their highest position and remain out of action.

The operation is as follows: When the main shaft B is set in motion, the several devices are actuated in the manner above described. Now, if all the pile carriers are up on the right side of their respective threads of the warps D, then the frame and carriers whose turn it is to make the next row of pile, are a short distance forward, while the others are a similar distance rearward. The hooks K are then swung back and passed between the forward pile threads and are then moved sidewise so as to catch them, and then the hooks move forward to their normal position carrying the pile threads along with them. The respective pile carrier frame G or G' then descends until the carriers are free from their own warp threads and then move across to the left side and rise again to their places, it being understood that the frames F and F' have meanwhile changed their positions so that the other carriers are now forward. Each bundle of threads from this frame to make the pile rises therefore from the fabric already woven, turns over its respective hook K down and under its respective warp thread and up on the other side and into the end of its carrier. The shuttle is then thrown across under all the carriers and all is beaten up tight by the batten, in the usual manner. The knife L then slides across the hooks K, cutting the pile and releasing the hooks, which latter rise and take up the next row of pile in the manner above described. The take-up mechanism previously described has meanwhile moved the work forward, this movement being caused by the traveling of the endless belt O. When a sufficient length of fabric has been woven to make a mat, then the changing lever Q' with its wheel Q slides over the end of the drum P and upon the reduced part $P^2$, and in so doing, causes the hooks $R^2$ to engage the pins $J^5$ and $J^6$ of the levers J and J', thus holding up the latter to keep both sets of pile warp carriers out of action. The link $Q^8$ is also raised at this time and lifts the rear end of the rod $K^4$, so that the hooks K also remain out of action, as previously described. The remaining parts of the loom keep on working, making a plain fabric without pile until a sufficient length of fabric of this kind has been made to finish off the mat. Then the lever Q' rises with the wheel Q to the reduced part $P^3$ of the drum P, which causes the irregular surface $Q^6$ of the lever $Q^3$ to be moved entirely out of the way of the pin $Q^7$ on the lever $O^8$, whereby the feed makes one long stroke of several inches. The lever $Q^3$ is then depressed again by the wheel Q assuming the second position, thus causing the weaving of a little plain fabric for starting another mat. The lever $Q^3$ is then depressed to a position in which the friction wheel Q rests on the part $P^4$ of the drum P, that is, between the first and second sizes, and releases the pile carriers, but does not bring the hooks K into action, and also allows the feed to take its normal stroke. While all this changing is going on, the threads which form the pile have been pulled tight over the plain fabric and open space from the last rows of pile, and they now take one turn each down and up again and the drum P moves the lever to its normal position, thus allowing the hooks K to act again. After this is done, the projecting portion $P^5$ of the drum P, acts on the wheel Q so as to depress the lever $Q^3$ an extra distance and hold it there until it is caught and held by the pin $Q^7$ on the feed lever $O^8$, and as the wheel Q of the lever Q' now passes off the abrupt part $P^5$ of the spiral of the cam P the spring $Q^{10}$ connected with the lever Q' carries the latter back over the entire length of the drum without touching any part of the latter until it reaches the stop $Q^5$. When the feed is again actuated it releases the lever $Q^3$ and the lever Q' connected therewith, so that the wheel Q held on the said lever Q' again falls into the thread on the drum P and the above described operation is repeated.

The invention has been described as applied to a mat loom in which two sets of carriers are used, but one set only may be employed when a different kind of mat is desired. In this case rods may be used to make the pile, instead of using the hooks, or the carriers may all be used but divided into more sets. The mechanism for automatically controlling the length of the mats woven in the loom may be dispensed with if desired.

As shown in Fig. 6, two sets of pile carriers are arranged, one forward and the other backward, the hooks then being swung toward the carriers and taking the pile. In the dotted position the hooks have returned to their former position, as above described.

In Fig. 7 the forward pile carriers have dropped clear of the upper warp threads and moved to the other side of their respective warp threads, either by their own motion or that of the harness. They have also moved to the back position while the back set have moved forward. As shown in Fig. 8, the carriers rise into a back position, and the shed changes so that the former lower warp threads are in an uppermost position and the others below. The shuttle S now passes, leaving the weft thread S' across the open shed, the batten C having beaten all back onto the previously formed fabric and at the same time the knife L cuts the loops of the pile, thereby releasing the hooks K, which now proceed to take the next row of pile in the manner above described.

Figs. 9 and 10 show the fabric produced, D being the ground warp, H, H' the pile, and S' the weft. To illustrate how the continuity of the pile threads is maintained, numerals are placed on the tufts of pile, the correspondingly numbered tufts having been cut apart by the knife L.

Having thus fully described my invention, I claim as new and desire to secure by Letters Patent—

1. In a loom for weaving pile fabrics, the combination with a batten having long reed plates, of pile yarn carriers passing between the reed plates and extending forward of the same nearly to where the fabric is formed, and means for causing each carrier to drop below and rise again alternately on opposite sides of that ground warp thread which passes between the same reed plates, substantially as shown and described.

2. In a loom, the combination with the batten and reed, of pile yarn carriers passing between the reed plates, means for moving the said carriers first to one side and then to the opposite side of the ground warp which passes between the same reeds, and hooks for catching the pile yarn and holding it in loops of the required length above the ground warps, substantially as shown and described.

3. In a loom, the combination with the batten and reed, of pile yarn carriers passing between the reed plates, means for moving the said carriers first to one side and then to the opposite side of the ground warp which passes between the same reeds, hooks for catching the pile yarn and holding it in loops of the required length above the ground warps, and a knife plate for cutting the pile loops on the hooks, substantially as shown and described.

4. In a loom for weaving pile fabrics the combination with the parts adapted to form the pile, of a rotatable drum made of sections of different diameters and having a continuous spiral thread, a suitable part adapted to engage the said spiral thread, and intermediate mechanism arranged to disengage the parts which form the pile after a fixed amount of fabric is woven so as to finish off with a plain fabric, then to make an extra long take-up and to start another piece with plain fabric so that a space is formed composed of warp threads only, substantially as shown and described.

WILLIAM BRITAIN, JR.

Witnesses:
WALTER GOODACRE,
SHEARMAN SHEPPARD.